US012409597B2

(12) United States Patent
Konaganti et al.

(10) Patent No.: US 12,409,597 B2
(45) Date of Patent: Sep. 9, 2025

(54) HIGH DENSITY POLYETHYLENE FOR RIGID ARTICLES

(71) Applicant: NOVA CHEMICALS (INTERNATIONAL) S.A., Fribourg (CH)

(72) Inventors: Vinod Konaganti, Calgary (CA); Marcelo Yamane, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 394 days.

(21) Appl. No.: 17/915,553

(22) PCT Filed: Apr. 6, 2021

(86) PCT No.: PCT/IB2021/052839
§ 371 (c)(1),
(2) Date: Sep. 29, 2022

(87) PCT Pub. No.: WO2021/205333
PCT Pub. Date: Oct. 14, 2021

(65) Prior Publication Data
US 2023/0140414 A1    May 4, 2023

Related U.S. Application Data

(60) Provisional application No. 63/006,239, filed on Apr. 7, 2020.

(51) Int. Cl.
| | | |
|---|---|---|
| C08L 23/16 | (2006.01) | |
| B29C 49/00 | (2006.01) | |
| C08F 2/34 | (2006.01) | |
| C08F 4/78 | (2006.01) | |
| C08F 210/02 | (2006.01) | |
| C08F 210/14 | (2006.01) | |
| C08K 3/22 | (2006.01) | |
| C08K 5/098 | (2006.01) | |
| C08L 23/06 | (2006.01) | |
| C08L 23/08 | (2025.01) | |
| C08L 23/0807 | (2025.01) | |
| B29L 31/00 | (2006.01) | |
| B29L 31/52 | (2006.01) | |
| C08K 5/00 | (2006.01) | |

(52) U.S. Cl.
CPC ............ B29C 49/0005 (2013.01); C08F 2/34 (2013.01); C08F 4/78 (2013.01); C08F 210/02 (2013.01); C08F 210/14 (2013.01); C08K 3/22 (2013.01); C08K 5/098 (2013.01); C08L 23/06 (2013.01); C08L 23/0815 (2013.01); *B29K 2023/04* (2013.01); *B29L 2031/5209* (2013.01); *B29L 2031/7154* (2013.01); *B29L 2031/7158* (2013.01); *C08K 2003/2296* (2013.01); *C08K 5/0083* (2013.01)

(58) Field of Classification Search
CPC . C08F 4/78; C08F 210/02; C08F 4/22; C08K 5/098; C08K 2003/2296; C08K 3/22; C08K 5/0083; C08K 5/09; B29C 49/0005; C08L 23/06; C08L 23/08; C08L 23/0815
See application file for complete search history.

(56) References Cited

U.S. PATENT DOCUMENTS

| | | |
|---|---|---|
| 2,825,721 A | 3/1958 | Hogan et al. |
| 3,023,203 A | 2/1962 | Dye |
| 3,248,179 A | 4/1966 | Norwood |
| 3,704,287 A | 11/1972 | Johnson |
| 4,011,382 A | 3/1977 | Levine et al. |
| 4,077,904 A | 3/1978 | Noshay et al. |
| 4,100,105 A | 7/1978 | Levine et al. |
| 4,115,639 A | 9/1978 | Brown et al. |
| 4,325,849 A | 4/1982 | Rosen |
| 4,543,399 A | 9/1985 | Jenkins et al. |
| 4,588,790 A | 5/1986 | Jenkins et al. |
| 4,611,016 A | 9/1986 | Hinskin |
| 4,613,484 A | 9/1986 | Ayres |
| 4,719,193 A | 1/1988 | Levine et al. |
| 5,028,670 A | 7/1991 | Chinh et al. |
| 5,166,279 A | 11/1992 | Speakman |
| 5,317,036 A | 5/1994 | Brady, III et al. |
| 5,352,749 A | 10/1994 | Dechellis et al. |
| 5,405,922 A | 4/1995 | Dechellis et al. |
| 5,436,304 A | 7/1995 | Griffin |
| 5,453,471 A | 9/1995 | Bernier et al. |
| 5,462,999 A | 10/1995 | Griffin et al. |
| 5,616,661 A | 4/1997 | Eisinger et al. |
| 5,668,228 A | 9/1997 | Chinh et al. |
| 5,684,097 A | 11/1997 | Palmroos et al. |

(Continued)

FOREIGN PATENT DOCUMENTS

| | | |
|---|---|---|
| EP | 0 640 625 A2 | 3/1995 |
| JP | 2013-249094 | 12/2013 |

OTHER PUBLICATIONS

Alberola, N., Cavaille, J. Y., & Perez, J., Mechanical spectrometry of alpha relaxations of high-density polyethylene. Journal of Polymer Science Part B: Polymer Physics, 1990, 28, 4, 569-586.

(Continued)

*Primary Examiner* — Rip A Lee
(74) *Attorney, Agent, or Firm* — Thomas J. Styslinger

(57) ABSTRACT

A composition comprising a high molecular weight, chromium catalyzed ethylene copolymer (also referred to as a polyethylene resin), a nucleating agent and zinc oxide.

15 Claims, No Drawings

(56) References Cited

U.S. PATENT DOCUMENTS

| | | | |
|---|---|---|---|
| 5,844,029 | A | 12/1998 | Prabhu et al. |
| 6,013,595 | A | 1/2000 | Lhost et al. |
| 6,153,715 | A | 11/2000 | Nakamura et al. |
| 6,599,971 | B2 | 7/2003 | Dotson et al. |
| 6,734,131 | B2 | 5/2004 | Shih et al. |
| 6,958,375 | B2 | 10/2005 | Shih et al. |
| 6,982,304 | B2 | 1/2006 | Mure et al. |
| 8,779,045 | B2 * | 7/2014 | Dotson ................ C08K 5/0083 524/394 |
| 10,730,221 | B2 * | 8/2020 | Borse .................... B29C 48/022 |
| 2017/0247526 | A1 | 8/2017 | Botros et al. |
| 2017/0274574 | A1 * | 9/2017 | Borse ...................... B32B 27/32 |
| 2017/0335077 | A1 * | 11/2017 | Borse ......................... C08J 5/18 |
| 2018/0346686 | A1 | 12/2018 | Waldie |
| 2019/0165337 | A1 * | 5/2019 | Pang ................... H01M 50/103 |

OTHER PUBLICATIONS

ASTM 1238-13, Standard Test Method for Melt Flow Rates of Thermoplastics by Extrusion Plastometer, Aug. 1, 2013, 16 pages.

ASTM 792-13, Standard Test Methods for Density and Specific Gravity (Relative Density) of Plastics by Displacement, Nov. 1, 2013, 6 pages.

Cheng et al., "Influence of micromolecular structure on environmental stress cracking resistance of high density polyethylene", Tunnelling and Underground Space Technology, vol. 26, No. 4, Mar. 22, 2011 (Mar. 22, 2011), pp. 582-593.

Journal of Macromolecular Science, Part A: Pure & Applied Chemistry (2009) 46, 572-583.

Kobayashi, M., Takahashi, T., Takimoto, J. I., & Koyama, K., Influence of Glass Beads on the Elongational Viscosity of Polyethylene with Anomalous Strain Rate Dependence of the Strain-Hardening, Polymer, 1996, 37, 16, 3745-3747.

Kouda, S., Prediction of Processability at Extrusion Coating for Low Density Polyethylene, Polymer Engineering & Science, 2008, 48, 6, 1094-1102.

Lu, L., Alamo, R. G., & Mandelkern, L., Lamellar thickness distribution in linear polyethylene and ethylene copolymers. Macromolecules, 1994, 27, 22, 6571-6576.

Van Krevelen, D. W., & Te Nijenhuis, K., Properties of polymers: their correlation with chemical structure; their numerical estimation and prediction from additive group contributions, 2009, Elsevier, Chapter 4.

Ward, I.M. Mechanical Properties of Solid Polymers; Wiley-Interscience: Toronto, 1971, Ch 4.

* cited by examiner

HIGH DENSITY POLYETHYLENE FOR RIGID ARTICLES

CROSS-REFERENCE TO RELATED APPLICATIONS

This application is a U.S. National Phase Application under 35 U.S.C. § 371 of International Application No. PCT/IB2021/052839, filed Apr. 6, 2021, which claims priority to and the benefit of U.S. Provisional Application No. 63/006,239, filed Apr. 7, 2020, both of which are hereby incorporated by reference in their entireties.

TECHNICAL FIELD

High density polyethylene (HDPE) compositions containing a nucleating agent and zinc oxide. The compositions are suitable for blow molding.

BACKGROUND ART

Blow molding is in widespread commercial use for the manufacture of hollow plastic parts such as bottles, storage tanks and toys.

Polypropylene, polyethylene terephthalate (PET) and polyethylene are commonly used in blow molding operations.

The use of nucleating agents in blow molding processes is known—see for example U.S. Pat. No. 6,153,715.

SUMMARY OF INVENTION

In one embodiment, there is provided:
a blow molding composition comprising:
A) a chromium catalyzed ethylene copolymer having
  i) a high load melt index, as measured by ASTM 1238 at 190° C. using a 21.6 kg load, of from 2 to 10 grams/10 minutes;
  ii) a density of from 0.944 to 0.955 g/cc;
B) from 100 to 5000 ppm of nucleating agent, comprising a metal salt of hexahydrophthalic acid; and
C) from 100 to 1000 ppm of zinc oxide.

In an embodiment, there is also provided a blow molded article that is prepared with the above described polyethylene composition.

In another embodiment, the ratio of lamella area of an ethylene copolymer formulation containing the specified nucleating agent and zinc oxide to that of the same ethylene copolymer but containing neither said nucleating agent nor said zinc oxide is greater than 1.04, especially from 1.04 to 1.3.

DESCRIPTION OF EMBODIMENTS

Part A: Cr Catalyzed Resin

The polyethylene of the present compositions is prepared with a chromium catalyst. The chromium catalyst may be a chromium oxide (i.e. $CrO_3$) or any compound convertible to chromium oxide. For compounds convertible to chromium oxide see U.S. Pat. Nos. 2,825,721; 3,023,203; and 4,011,382. Compounds convertible to chromium oxide include for example, chromic acetyl acetone, chromic chloride, chromic nitrate, chromic acetate, chromic sulfate, ammonium chromate, ammonium dichromate, and other soluble chromium containing salts.

The chromium catalyst may be a silyl chromate catalyst. Silyl chromate catalysts are chromium catalysts which have at least one group of the formula:

$$\begin{array}{c} R \\ | \\ -Si-O-\overset{\overset{\displaystyle O}{\|}}{Cr}-O- \\ | \quad\quad \| \\ R \quad\quad O \end{array}$$

wherein R is independently a hydrocarbon group having from 1 to 14 carbon atoms.

The silyl chromate catalyst may also be a bis(silyl) chromate catalyst which has the formula:

$$\begin{array}{c} R' \quad\quad O \quad\quad R' \\ | \quad\quad \| \quad\quad | \\ R'-Si-O-Cr-O-Si-R' \\ | \quad\quad \| \quad\quad | \\ R' \quad\quad O \quad\quad R' \end{array}$$

wherein R' is independently a hydrocarbon group having from 1 to 14 carbon atoms.

R or R' can independently be any type of hydrocarbyl group such as an alkyl, alkylaryl, arylalkyl or an aryl radical. Some non-limiting examples of R or R' include methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like.

Illustrative of preferred silyl chromates but by no means exhaustive or complete of those that can be employed are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate and the like. Examples of bis-trihydrocarbylsilylchromate catalysts are also disclosed in U.S. Pat. Nos. 3,704,287 and 4,100,105.

The chromium catalyst may also be a mixture of chromium oxide and silyl chromate catalysts.

The present polyethylene may be prepared with chromocene catalysts (see for example U.S. Pat. Nos. 4,077,904 and 4,115,639) and chromyl chloride (e.g. $CrO_2Cl_2$) catalysts. Additionally, the polyethylene may be prepared with a "titanated" chromium catalyst which may be prepared by co-supporting a chromium compound (such as $CrCl_3$) and a titanium compound (such as titanium tetra butoxide), followed by activation in dry air at elevated temperatures (as disclosed, for example, in U.S. Pat. No. 5,166,279, Speakman; assigned to BP).

The chromium catalysts described above may be immobilized on an inert support material, such as for example an inorganic oxide material. Suitable inorganic oxide supports are composed of porous particle materials having a spheroid shape and a size ranging from about 10 micrometers to about 200 micrometers (μm). The particle size distribution can be broad or narrow. The inorganic oxide typically will have a surface area of at least about 100 m²/g, especially from about 150 to 1,500 m²/g. The pore volume of the inorganic oxide support should be at least 0.2, preferably from about 0.3 to 5.0 mL/g. The inorganic oxides may be selected from group 2, 3, 4, 5, 13 and 14 metal oxides generally, such as silica, alumina, silica-alumina, magnesium oxide, zirconia, titania, and mixtures thereof. The use of clay (e.g. montmorillonite) and magnesium chloride as support materials is also contemplated.

When the inorganic oxide is a silica support, it will preferably contain not less than 80% by weight of pure $SiO_2$, with the balance being other oxides such as but not limited to oxides of Zr, Zn, Mg, Ti, Mg and P.

Generally, the inorganic oxide support will contain acidic surface hydroxyl groups that will react with a polymerization catalyst. Prior to use, the inorganic oxide may be dehydrated to remove water and to reduce the concentration of surface hydroxyl groups. For example, the inorganic oxide may be heated at a temperature of at least 200° C. for up to 24 hours, typically at a temperature of from about 500° C. to about 800° C. for about 2 to 20 hours, preferably 4 to 10 hours. The resulting support will be free of adsorbed water and should have a surface hydroxyl content from about 0.1 to 5 mmol/g of support, preferably from 0.5 to 3 mmol/g.

Although heating is the preferred means of removing surface hydroxyl groups present in inorganic oxides, such as silica, the hydroxyl groups may also be removed by other removal means, such as chemical means. For example, a desired proportion of OH groups may be reacted with a suitable chemical agent, such as a hydroxyl reactive aluminum compound (e.g. triethylaluminum) or a silane compound. (See: U.S. Pat. No. 4,719,193 to Levine).

A silica support that is suitable has a high surface area and is amorphous. By way of example, useful silicas are commercially available under the trademark of SYLOPOL® 958, 955 and 2408 from Davison Catalysts, a Division of W. R. Grace and Company and ES-70W™ from INEOS Silica.

The amount of chromium catalyst added to the support should be sufficient to obtain between 0.01% and 10%, preferably from 0.1% to 3%, by weight of chromium, calculated as metallic chromium, based on the weight of the support.

Processes for depositing chromium catalysts on supports are well known in the art (for some non-limiting methods for supporting chromium catalysts see U.S. Pat. Nos. 6,982,304; 6,013,595; 6,734,131; 6,958,375; and European Patent No. 640,625). For example, the chromium catalyst may be added by co-precipitation with the support material or by spray-drying with the support material. The chromium catalyst may also be added by a wet incipient method (i.e. wet impregnation) or similar methods using hydrocarbon solvents or other suitable diluents. Alternatively, the supported chromium catalyst may be obtained by the mechanical mixing of a solid chromium compound with a support material, followed by heating the mixture. In another variation, the chromium compound may be incorporated into the support during the manufacture thereof; so as to obtain a homogeneous dispersion of the metal in the support. In a typical method, a chromium catalyst is deposited on a support from solutions of the chromium catalyst and in such quantities as to provide, after an activation step (if required, see below), the desired levels of chromium on the support.

The chromium catalyst may require activation prior to use. Activation may involve calcination (as is preferred in the case of chromium oxide) or the addition of a co-catalyst compound (as is preferred in the case of silyl chromate).

Activation by calcination can be accomplished by heating the supported chromium catalyst in steam, dry air or another oxygen containing gas at temperatures up to the sintering temperature of the support. Activation temperatures are typically in the range of 300° C. to 950° C., preferably from 500° C. to 900° C. and activation times are typically from about 10 minutes to as about 72 hours. The chromium catalyst may optionally be reduced after activation using for example, carbon monoxide or a mixture of carbon monoxide and nitrogen.

The supported chromium catalysts may optionally comprise one or more than one co-catalyst and mixtures thereof. The co-catalyst can be added to the support or the supported chromium catalyst using any well-known method. Hence, the co-catalyst and chromium catalyst can be added to the support in any order or simultaneously. Alternatively, the co-catalyst can be added to the supported chromium catalyst in situ. By way of a non-limiting example, the co-catalyst is added as a solution or slurry in hydrocarbon solvent to the supported chromium catalyst which is optionally also in hydrocarbon solvent.

Co-catalysts include compounds represented by formula:

$$M^*R^2_n$$

where M* represents an element of the Group 1, 2 or 13 of the Periodic Table, a tin atom or a zinc atom; and each $R^2$ independently represents a hydrogen atom, a halogen atom (e.g. chlorine fluorine, bromine, iodine and mixtures thereof), an alkyl group (e.g. methyl, ethyl, propyl, pentyl, hexyl, heptyl, octyl, decyl, isopropyl, isobutyl, s-butyl, t-butyl), an alkoxy group (e.g. methyoxy, ethoxy, propoxy, butoxy, isopropoxy), an aryl group (e.g. phenyl, biphenyl, naphthyl), an aryloxy group (e.g. phenoxy), an arylalkyl group (e.g. benzyl, phenylethyl), an arylalkoxy group (benzyloxy), an alkylaryl group (e.g. tolyl, xylyl, cumenyl, mesityl), or an alkylaryloxy group (e.g. methylphenoxy), provided that at least one $R^2$ is selected from a hydrogen atom, an alkyl group having 1 to 24 carbon atoms or an aryl, arylalkyl or alkylaryl group having 6 to 24 carbon atoms; and n is the oxidation number of M*.

Preferred co-catalysts are organoaluminum compounds having the formula:

$$Al^2(X^1)_n(X^2)_{3-n}$$

where $(X^1)$ is a hydrocarbyl having from 1 to about 20 carbon atoms; $(X^2)$ is selected from alkoxide or aryloxide, any one of which having from 1 to about 20 carbon atoms; halide; or hydride; and n is a number from 1 to 3, inclusive. Specific examples of $(X^1)$ moieties include, but are not limited to, ethyl, propyl, n-butyl, sec-butyl, isobutyl, hexyl, and the like. In another aspect, $(X^2)$ may be independently selected from fluoro or chloro. The value of n is not restricted to be an integer, therefore, this formula includes sesquihalide compounds or other organoaluminum cluster compounds.

Some non-limiting examples of aluminum co-catalyst compounds that can be used include, but are not limited to, trialkylaluminum compounds, dialkylaluminum halide compounds, dialkylaluminum alkoxide compounds, dialkylaluminum hydride compounds, and combinations thereof. Specific examples of organoaluminum co-catalyst compounds that are useful include but are not limited to: trimethylaluminum (TMA); triethylaluminum (TEA); triisopropylaluminum; diethylaluminum ethoxide; tributylaluminum; disobutylaluminum hydride; triisobutylaluminum; and diethylaluminum chloride.

The supported chromium catalyst may be combined with mineral oil in an amount which does not form a slurry of the supported chromium catalyst in the mineral oil.

The term "mineral oil" as used herein refers to petroleum hydrocarbons and mixtures of hydrocarbons that may include aliphatic, napthenic, aromatic, and/or paraffinic components that are viscous liquids at 23° C. and preferably have a dynamic viscosity of at least 40 centiPoises (cP) at 40° C. or a kinematic viscosity of a least 40 centistokes (cSt) at 40° C.

There are three basic classes of refined mineral oils including paraffinic oils based on n-alkanes; napthenic oils based on cycloalkanes; and aromatic oil based on aromatic hydrocarbons. Mineral oils are generally a liquid by-product of the distillation of petroleum to produce gasoline and other petroleum based products from crude oil. Hence, mineral oils may be, for example, light, medium or heavy oils coming from the distillation of coal tars or oils obtained during the fractional distillation of petroleum. Mineral oil obtained from petroleum sources (i.e. as a distillate product) will have a paraffinic content, naphthenic content and aromatic content that will depend on the particular type of petroleum used as a source material.

Mineral oils may have a molecular weight of at least 300 amu to 500 amu or more, and a kinematic viscosity at 40° C. of from 40 to 300 centistokes (cSt, note: 1 cSt=1 mm$^2$/s) or greater.

A mineral oil may be a transparent, colourless oil composed mainly of alkanes (typically 15 to 40 carbons) and cyclic paraffins related to petroleum jelly.

Mineral oils may be oils which are hydrocarbon mixtures distilling from about 225° C. to about 400° C. Typical examples of such mineral oils are the ONDINA® 15 to 68 oils sold by Shell or their equivalents.

The term "mineral oil" includes synthetic oils and other commercial oils such as paraffin oils sold under such names as KAYDOL® (or White Mineral Oil), ISOPAR®, STRUK-TOL®, SUNPAR® oils, PARAPOL® oils, and other synthetic oils, refined naphthenic hydrocarbons, and refined paraffins known in the art.

Preferably the mineral oil is substantially free of impurities which may negatively affect the chromium catalyst activity or performance. Hence, it is preferably to use relatively pure mineral oil (i.e. greater than 95 percent pure or greater than 99 percent pure). Suitable mineral oils include KAYDOL, HYDROBRITE® 550, and HYDROBRITE 1000 available from Crompton Chemical Corporation.

The mineral oil may be a hydrocarbon mineral oil which is viscous and comprises primarily aliphatic hydrocarbons oils. Examples of suitable mineral oils include paraffinic/naphthenic oils such as those sold under the names KAYDOL, SHELLFLEX® 371 and TUFFLO® 6000.

The mineral oil may also be a mixture or blend of two or more mineral oils in various concentrations.

Silicon oils are also suitable.

In an embodiment, the mineral and silicon oils are those that exclude moieties that are reactive with chromium catalysts, examples of which include hydroxyl and carboxyl groups.

The methods for adding a mineral oil to the chromium catalyst are not limited but it is preferred that the resulting catalyst be in the form of a solid powder, preferably a free flowing powder, and which is not a slurry of solid catalyst in mineral oil. Hence, the amount of mineral oil added to a supported chromium catalyst should be less than the amount required to give a slurry of the supported chromium catalyst in mineral oil. Sticky or tacky particulate catalysts are not as easily fed to a polymerization reactor as a dry catalyst powder.

The amount of mineral oil that can be added to a chromium catalyst without forming a slurry can be determined by experiment and will depend on a number of factors such as the type of chromium catalyst used, and especially the type and physical properties of the support on which the chromium catalyst is immobilized.

A supported chromium catalyst may comprise from 1 to 45 weight percent (especially 5 to 40 weight percent) of mineral oil based on the entire weight of the supported chromium catalyst.

One convenient way to combine a mineral oil with a supported chromium catalyst is to combine them in suitable hydrocarbon diluents. Without wishing to be bound by theory, the use of hydrocarbon diluent(s) may assist the mineral oil in penetrating the pores of the catalyst support. As used herein, the term "hydrocarbon diluent(s)" is meant to include any suitable hydrocarbon diluents other than mineral oils (or silicon oils). For example, n-pentane, isopentane, n-hexane, benzene, toluene, xylene, cyclohexane, isobutane and the like can be used as a hydrocarbon diluent. One or more hydrocarbon diluents may be used. A mixture of hydrocarbon diluent(s) and mineral oil may be added to a dry catalyst powder (i.e. the supported chromium catalyst) or to a catalyst powder slurried in a suitable diluent. Stirring or other agitation may be used. Alternatively, a dry catalyst (i.e. the supported chromium catalyst) powder may be added to a mineral oil or a mineral oil/hydrocarbon diluent mixture, either directly or as a slurry in suitable hydrocarbon diluents (s). When the supported chromium catalyst and the mineral oil are combined in the presence of hydrocarbon diluents(s), the hydrocarbon diluents(s) should be subsequently removed. Diluent(s) can be removed by using one or more steps selected from washing, filtration and evaporation steps, but the use of exclusively evaporation steps is preferred so as not to remove the mineral oil component from the supported chromium catalyst. Mineral oil may also be added directly to a dry catalyst powder (i.e. the supported chromium catalyst) or vice versa which may optionally be washed with hydrocarbon diluent(s). The oil may also be sprayed onto the dry catalyst powder or the mineral oil may be stirred/tumbled with the dry catalyst powder.

It is preferable to take a pre-made supported chromium catalyst and subsequently treat it with mineral oil either directly or in the presence of hydrocarbon diluent(s). For example, a mineral oil solution or suspension in a suitable hydrocarbon may be added to a supported chromium catalyst followed by the removal of hydrocarbon using well known methods. Such a technique would be suitable for plant scale process and may employ one or more mixing tanks, and one or more solvent/diluent removal steps.

For example, a blend of a mineral oil and hydrocarbon diluent selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof may be added to a supported chromium catalyst followed by removal of the hydrocarbon diluent. In another embodiment, a mineral oil and hydrocarbon diluent selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof is added to a supported chromium catalyst followed by removal of the hydrocarbon diluent.

When the mineral oil is blended with a suitable hydrocarbon diluent, the diluents-mineral oil mixture may comprise from 1 to 99 wt. %, by weight of mineral oil, preferably at least 5 or at least 10 or at least 15 wt. % of mineral oil.

Removal of hydrocarbon diluents by evaporation/drying is well known, but preferably the evaporation is carried out under conditions which do not adversely affect the performance of the chromium catalyst. Hence evaporation or drying is carried out under temperatures which do not cause agglomeration of sticking of the catalyst particles together. Removal of hydrocarbon diluents can be carried out under ambient pressures or reduced pressures. Removal of hydrocarbon diluents can be achieved under ambient temperatures or elevated temperatures, provided that elevated temperatures do not lead to catalyst deactivation or catalyst particle agglomeration/sticking. Hydrocarbon diluents may in some circumstances (i.e. for low boiling hydrocarbons) be "blown off" using an inert gas. The time required to remove the hydrocarbon diluents(s) will preferably be sufficient to provide a supported chromium catalyst in solid form, preferably as free flowing particulate solid or powder.

The mineral oil and/or hydrocarbon diluent(s) may also be treated with a scavenger prior to combination with a chromium catalyst.

The scavenger can be any substance which consumes or deactivates trace impurities or poisons and which adversely affect the activity of the chromium catalyst. Suitable scavengers are well known and include organometallic compounds, such as but not limited to organoaluminum compounds having the formula:

$$Al^4(X^5)_n(X^6)_{3-n}$$

where $(X^5)$ is a hydrocarbyl having from 1 to about 20 carbon atoms; $(X^6)$ is selected from alkoxide or aryloxide, any one of which having from 1 to about 20 carbon atoms; halide; or hydride; and n is a number from 1 to 3, inclusive; or alkylaluminoxanes having the formula:

$$R^{30}_2Al^5O(R^{30}Al^5O)_mAl^5R^{30}_2$$

wherein each $R^{30}$ is independently selected from the group consisting of $C_{1-20}$ hydrocarbyl radicals and m is from 3 to 50. Preferred scavengers are trialkylaluminum compounds and include triisobutylaluminum, and triethylaluminum.

The chromium catalyst may be added to a polymerization zone using a dry catalyst feeder. Dry catalyst feeders are well known to persons skilled in the art and generally include a loading tube/chamber which is connected to a polymerization reactor and which under positive gas pressure delivers a catalyst "plug" to the reactor zone. The catalyst feeder, typically made of metal, may comprise a chamber having a mesh or screen and a metal plate with holes in it and which leads to tubing which carries the dry catalyst into the reactor. The operation is often carried out under a nitrogen atmosphere and the dry catalyst is transferred to the reactor under positive nitrogen pressure.

The supported chromium catalyst may be used in a slurry phase or a gas phase polymerization process to produce the present polyethylenes.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see for example, U.S. Pat. No. 4,325,849) to approximately twice that (i.e. from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction typically takes place in a closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomer (and comonomers) flowing through the bed. Un-reacted monomer, comonomer and other optional gaseous components exit the fluidized bed and are contacted with a cooling system to remove this heat. The cooled gas stream, including monomer, comonomer and optional other components (such as condensable liquids), is then re-circulated through the polymerization zone, together with "make-up" monomer (and comonomer) to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 psig. In a more specific embodiment, the pressure can range from about 100 psig (690 kPa) to about 500 psig (3448 kPa). In another more specific embodiment, the pressure can range from about 200 psig (1379 kPa) to about 400 psig (2759 kPa). In yet another more specific embodiment, the pressure can range from about 250 psig (1724 kPa) to about 350 psig (2414 kPa).

The reactor temperature in a gas phase process may vary according to the heat of polymerization as described above.

In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene homopolymer from ethylene alone, but other monomers (i.e. comonomers) may also be employed in order to give polyethylene copolymer.

Preferably the comonomer is an alpha-olefin having from 3 to 15 carbon atoms, preferably 4 to 12 carbon atoms and most preferably 4 to 6 carbon atoms.

Optionally, scavengers are added to the polymerization process. Scavengers are well known in the art.

Suitable scavengers include organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or alkylaluminoxanes having the formula: $R^3{}_2Al^1O(R^3Al^1O)_mAl^1R^3{}_2$, wherein each $R^3$ is independently selected from the group consisting of $C_{1-20}$ hydrocarbyl radicals and m is from 3 to 50. Some non-limiting preferred examples of useful scavengers include triisobutylaluminum, triethylaluminum, trimethylaluminum or other trialkylaluminum compounds.

The scavenger may be used in any suitable amount but by way of non-limiting examples only, can be present in an amount to provide a molar ratio of Al:M (where M is the metal of the organometallic compound) of from about 20 to about 2000, or from about 50 to about 1000, or from about 100 to about 500. Generally, the scavenger is added to the reactor prior to the catalyst and in the absence of additional poisons and over time declines to 0, or is added continuously.

Optionally, the scavengers may be independently supported. For example, an inorganic oxide that has been treated with an organoaluminum compound or alkylaluminoxane may be added to the polymerization reactor.

The polyethylene resins used in the present compositions are further characterized by having a very high molecular weight. This is quantified by the requirement that the resins have a very low High Load Melt Index (HLMI), as measured by ASTM 1238 at 190° C. using a 21.6 kg weight. More specifically, the resins have a HLMI of less than 10 g/10 minutes, especially from 2 to 8 g/10 minutes. Polyethylene resin that is prepared with a Cr catalyst also typically contains long chain branching (LCB). This combination of properties (i.e. high molecular weight/low HLMI and the presence of LCB) can disrupt the crystallinity of the resin as it freezes from melt and, in general, this combination of properties has been observed to reduce the effectiveness of some nucleating agents.

The polyethylene resin used in the present compositions is additionally characterized by having a comonomer (i.e. homopolymers are excluded) and by having a density of from 0.944 to 0.955 g/cc.

The polyethylene resin may be unimodal or bimodal. The use of bimodal/multimodal resins for blow molding processes is being proposed/recommended at an increasing rate as such resins become commercially available. However, a disadvantage of bimodal/multimodal resins is that they can be comparatively expensive. One advantage of the present technology is that high quality parts can be made at high rates when using a comparatively inexpensive unimodal resin.

Part B: Nucleating Agent

The nucleating agent used in the present compositions must be present in amounts of from 100 to 5,000 parts per million by weight.

The nucleating agent is a metal salt of a hexahydrophthalic acid (HHPA), as disclosed in U.S. Pat. No. 6,599,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971.

In an embodiment, the nucleating agent is 1,2-cyclohexanedicarboxylic acid, calcium salt (CAS registry number 491589-22-1). In an embodiment, the nucleating agent is provided in combination with zinc stearate (especially such that the zinc stearate is present in an amount of from 25 to 40 weight percent, based on the combined weight of the zinc stearate and nucleating agent). The nucleating agent is used in an amount of from 100 to 5000 ppm (especially from 200 to 2000 ppm).

Part C: Zinc Oxide (ZnO)

ZnO is essential and used in an amount of from 100 to 1000 ppm.

ZnO is a widely available item of commerce.

Part D: Other Additives

The HDPE may also contain other conventional additives, especially primary antioxidants, secondary antioxidants and Hindered Amine Light Stabilizers.

Primary antioxidants include (but are not limited to) phenolics, hydroxyl amines (and amine oxides) and lactones.

Phenolic Antioxidants

Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6-tricyclohexyphenol; and 2,6-di-tert-butyl-4-methoxymethylphenol.

Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5- tert-butyl-4-hydroxy2-methylphenyl)-3-dodecyl-mercaptobutane; ethyleneglycol-bis-(3,3-bis-(3'-tert-butyl-4'-hydroxyphenyl)-butyrate)-di-(3-tert-butyl-4-hydroxy-5-methylpentyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

Benzyl Compounds

For example, 1,3,5-tris-(3,5-di-tert-butyl-4-hydroxybenzyl)-2,4,6-trimethylbenzene; bis-(3,5-di-tert-butyl-4-hydroxybenzyl)sulfide; isooctyl 3,5-di-tert-butyl-4-hydroxybenzyl-mercaptoacetate; bis-(4-tert-butyl-3hydroxy-2,6-dimethylbenzyl)dithiol-terephthalate; 1,3,5-tris-(3,5-di-tert-butyl-4,10 hydroxybenzyl)isocyanurate; 1,3,5-tris-(4-tert-butyl-3-hydroxy-2,6-dimethylbenzyl)isocyanurate; dioctadecyl 3,5-di-tert-butyl-4-hydroxybenzylphosphonate; calcium salt of monoethyl 3,5-di-tertbutyl-4-hydroxybenzylphosphonate; and 1,3,5-tris-(3,5-dicyclohexyl-4-hydroxybenzyl)isocyanurate.

Acylaminophenols

For example, 4-hydroxy-lauric acid anilide; 4-hydroxy-stearic acid anilide; 2,4-bis-octylmercapto-6-(3,5-tert-butyl-4-hydroxyanilino)-s-triazine; and octyl-N-(3,5-di-tert-butyl-4-hydroxyphenyl)-carbamate.

Esters of beta-(5-tert-butyl-4-hydroxy-3-methylphenyl)-propionic acid with

Monohydric or Polyhydric Alcohols

For example, methanol; diethyleneglycol; octadecanol; triethyleneglycol; 1,6-hexanediol; pentaerythritol; neopentylglycol; tris-hydroxyethyl isocyanurate; thidiethyleneglycol; and dihydroxyethyl oxalic acid diamide.

Amides of
beta-(3,5-di-tert-butyl-4hydroxyphenol)-propionic
Acid

For example, N,N'-di-(3,5-di-tert-butyl-4-hydroxyphenylpropionyl)-hexamethylendiamine; N,N'-di-(3,5-di-tert-butyl-4-hydroxyphenylpropionyl)trimethylenediamine; and N,N'-di(3,5-di-tert-butyl-4-hydroxyphenylpropionyl)-hydrazine.

Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also meant to be included by the definition of hydroxylamine.

Lactones

The use of lactones such as benzofuranone (and derivatives thereof) or indolinone (and derivatives thereof) as stabilizers is described in U.S. Pat. No. 4,611,016.

Secondary Antioxidants

Secondary antioxidants include (but are not limited to) phosphites, diphosphites and phosphonites. Non-limiting examples of suitable aryl monophosphites follow. Preferred aryl monophosphites are indicated by the use of trademarks in square brackets.

Triphenyl phosphite; diphenyl alkyl phosphites; phenyl dialkyl phosphites; tris(nonylphenyl) phosphite [WESTON® 399, available from ADDIVANT™]; tris(2,4-di-tert-butylphenyl) phosphite [IRGAFOS® 168, available from Ciba Specialty Chemicals Corp.]; and bis(2,4-di-tert-butyl-6-methylphenyl) ethyl phosphite [IRGAFOS 38, available from Ciba Specialty Chemicals Corp.]; and 2,2',2"-nitrilo[triethyltris(3,3'5,5'-tetra-tert-butyl-1,1'-biphenyl-2,2'-diyl) phosphite [IRGAFOS 12, available from Ciba Specialty Chemicals Corp.].

Diphosphite

As used herein, the term diphosphite refers to a phosphite stabilizer which contains at least two phosphorus atoms per phosphite molecule (and, similarly, the term diphosphonite refers to a phosphonite stabilizer which contains at least two phosphorus atoms per phosphonite molecule).

Non-limiting examples of suitable diphosphites and diphosphonites follow: distearyl pentaerythritol diphosphite, diisodecyl pentaerythritol diphosphite, bis(2,4 di-tert-butylphenyl) pentaerythritol diphosphite [ULTRANOX® 626, available from ADDIVANT™]; bis(2,6-di-tert-butyl-4-methylpentyl) pentaerythritol diphosphite; bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tetrakis(2,4-di-tert-butylphenyl)4,4'-bipheylene-diphosphonite [IRGAFOS P-EPQ, available from Ciba] and bis(2,4-dicumylphenyl) pentaerythritol diphosphite [DOVERPHOS® S9228-T or DOVERPHOS S9228-CT].

PEPQ (CAS No 119345-01-06) is an example of a commercially available diphosphonite.

The diphosphite and/or diphosphonite are commonly used in amounts of from 200 ppm to 2,000 ppm, preferably from 300 to 1,500 ppm and most preferably from 400 to 1,000 ppm.

The use of diphosphites is preferred over the use of diphosphonites. The most preferred diphosphites are those available under the trademarks DOVERPHOS S9228-CT and ULTRANOX 626.

Hindered Amine Light Stabilizers (HALS)

A hindered amine light stabilizer (HALS) may be included in the stabilizer package used in the present compositions if the plastic part is intended for more than single/short term use.

HALS are well known to those skilled in the art.

When employed, the HALS is preferably a commercially available material and is used in a conventional manner and amount.

Commercially available HALS include those sold under the trademarks CHIMASSORB® 119; CHIMASSORB 944; CHIMASSORB 2020; TINUVIN® 622 and TINUVIN 770 from Ciba Specialty Chemicals Corporation, and CYASORB® UV 3346, CYASORB UV 3529, CYASORB UV 4801, and CYASORB UV 4802 from Cytec Industries. TINUVIN 622 is preferred. Mixtures of more than one HALS are also contemplated.

Suitable HALS include: bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-carbonic acid; and 1,1'(1,2-ethanediyl)-bis-(3,3,5,5-tetramethylpiperazinone).

Part D: Blow Molding Process

The term "blow molding" as used herein is meant to refer to a well-known, commercially important process that is widely used to manufacture hollow plastic goods. In general, the process starts with a "pre-form" or "parison" of the plastic. The parison is clamped into the mold; heated and then stretched by directing a flow of gas (usually air) into the parison. The pressure from the gas forces the outer surface of the parison against the walls of the mold. The plastic is then cooled and removed from the mold.

Effect of Zinc Oxide and Nucleating Agent

The present polyethylene compositions must contain a combination of a specific nucleating agent and zinc oxide. This combination is observed to increase the strain hardening index of the high density polyethylene composition. While not wishing to be bound by theory, the improved/increased strain hardening index is believed to improve the parison stability during the blow molding process and there by producing articles of uniform thickness.

The rise in strain hardening behavior may be due to the formation of smaller spherulite sizes with increased interlamellar linkages. Such compositions have been observed to have enhanced lamella area (calculated using the method described in *Journal of Macromolecular Science, Part A: Pure and Applied Chemistry*, 2009, 46, 572-583). It was postulated that larger lamella area causes enhanced phase interconnectivity (*Tunnelling and Underground Space Technology* 26, 2011, 582-593, *Journal of Macromolecular Science, Part A: Pure and Applied Chemistry*, 2009, 46, 572-583).

The present compositions may be used to prepare rigid articles or containers by blow-molding such as Drums, Intermediate Bulk Containers (IBCs), and Blow molded fuel tanks using a monomodal or multimodal HDPE resin. The commonly used key performance properties of rigid bulk containers include Environmental Stress Cracking Resistance (ESCR) which is reported to be a function of lamella area/lamella thickness) and tensile strength (which can be correlated to strain hardening behavior of the resins).

Strain Hardening Index (SHI) Using Elongational Viscometry

The strain hardening behavior of several resins and/or compositions shown in the Examples were studied in uniaxial extension using Sentmanat Extension Rheometer (SER) universal testing platform fixture compatible to Rheometrics, Inc. RDS-II rotational rheometer. The transient elongational viscosity measurements were performed at a Hencky strain rate of 1 s$^{-1}$ at a temperature of 150° C. or 190° C. The elongational viscosities are compared with linear viscoelastic (LVE) baseline (i.e., 3ηs=3 times shear viscosity) obtained using the frequency sweep data according to Kobayashi correlation (Kobayashi, M., Takahashi, T., Takimoto, J. I., & Koyama, K., *Influence of glass beads on the elongational viscosity of polyethylene with anomalous strain rate dependence of the strain-hardening. Polymer*, 1996, 37, 16, 3745-3747).

Based on elongational viscosity data and following the definition by Kouda (Kouda, S., *Prediction of processability at extrusion coating for low-density polyethylene. Polymer Engineering & Science*, 2008, 48, 6, 1094-1102), the strain hardening index (SHI) is given as:

$$SHI = \frac{\eta_E^+}{3\eta_0} \qquad (1)$$

where $\eta_E^+$ is uniaxial elongational viscosity and $\eta_O$ is shear viscosity. The elongational viscosity measurements were carried at different temperatures ranging from 140° C. to 200° C. The SHI values were calculated at a Hencky strain rate of 1 s$^{-1}$ and time of 1 s.

Lamella Thickness Distribution from Differential Scanning Calorimetry (DSC) Data A Differential Scanning Calorimeter sold under the name TA Instruments Q2000 was used to obtain the thermograms of the polyethylene compositions. The polyethylene composition is heated from a temperature of 50 to 200° C. at the rate of 10° C./min and equilibrated at 200° C. for about 15 min to eliminate any thermal or flow histories. Then the sample is cooled down to 50° C. at a cooling rate of 10° C./min and reheated to 200° C. at the same heating rate (i.e., 10° C./min). The DSC endotherms (from the second heating cycle) that give melting distribution are used to determine the lamellar thickness distribution using the modified form of Thomson-Gibbs relation (Alberola, N., Cavaille, J. Y., & Perez, J., *Mechanical spectrometry of alpha relaxations of high-density polyethylene. Journal of Polymer Science Part B: Polymer Physics*, 1990, 28, 4, 569-586).

According to Thomson-Gibbs equation, the thickness of lamellae L melting at the temperature T is given by (Lu, L., Alamo, R. G., & Mandelkern, L., *Lamellar thickness distribution in linear polyethylene and ethylene copolymers. Macromolecules*, 1994, 27, 22, 6571-6576):

$$L = \frac{2\sigma_e}{\Delta H_f}\left(1 - \frac{T}{T_m^0}\right) \qquad (2)$$

where T is the melting temperature of a lamellar crystallite of thickness L, $T_m^0$ is the equilibrium melting temperature of the infinitely thick crystal taken as 145.5° C., $\sigma_e$ is the interfacial free energy of the basal plane considered as 287 mJ/m$^2$, and $\Delta H_f$ is the enthalpy of fusion per repeating unit taken as 290 J/cm$^3$.

The lamellar thickness distribution (defined as intensity for a given lamellae thickness, I(L)) using the modified form of Thomson-Gibbs relation described by Albertola et al. (Alberola, N., Cavaille, J. Y., & Perez, J., *Mechanical spectrometry of alpha relaxations of high-density polyethylene. Journal of Polymer Science Part B: Polymer Physics*, 1990, 28, 4, 569-586) is as follows:

$$I(L) = \left(\frac{1}{M}\frac{dM}{dL}\right)dL = \frac{\rho}{k}\frac{dH}{dt}\frac{(T_m^0 - T)^2}{2\sigma_e T_m^0}dL \qquad (3)$$

where M is mass of the total crystalline phase, ρ is the density of the sample at T, k is the heating rate, dM is the mass of crystalline phase which melts between T and T+dT and dH/dT, obtained by the DSC curve, is the energy required to melt the dM fraction of the crystalline phase.

The value of average lamellar thickness is determined by the area under intensity curves using the following formula:

$$L_{avg} = \Sigma_{i=1}^n A_i L_i \qquad (4)$$

where $A_i$ is the area under the intensity curve corresponding to the fraction 'i' and $L_i$ is the lamellar thickness value calculated using equation (2). The values of average lamellar thickness of polyethylene compositions described in the examples are listed in Table 1.

The lamella lateral surface area per mole, simply referred as lamella area, can be calculated using the following equation:

$$L_{area} = \frac{vM_W}{L_{avg}} \qquad (5)$$

where v is specific volume, $M_W$ is weight average molecular weight, and $L_{avg}$ is average lamella thickness. The lamella density can be considered nearly equal to the unit-cell density of a perfect polyethylene crystal, which is equal to 1 g/cc (Van Krevelen, D. W., & Te Nijenhuis, K., *Properties of polymers: their correlation with chemical structure; their numerical estimation and prediction from additive group contributions*, 2009, *Elsevier*). For the present calculations, the specific volume of a polyethylene crystal is assumed to be $10^{-3}$ m$^3$/kg. The lamellar area values of polyethylene compositions described in the examples are also listed in Table 1.

Blow molding is commercially used for the preparation of a wide variety of goods including small water bottles (having a volume of from about 500 ml to 2 liters); hollow toys; plastic drums (having a typical volume of from 150 to 250 liters) and intermediate bulk containers (which may have a volume of several thousand liters).

EXAMPLES

Part A: Preparation of a Cr Catalyzed HDPE
1. Catalyst Preparation

The catalyst used to prepare the HDPE used in this example generally comprises a silyl chromate and an alkyl aluminum alkoxide that is supported on silica.

The silica support was a commercially available material that is old by W. R. Grace under the tradename D955 Silica. The support was calcined at 600° C. to reduce the level of surface hydroxyl groups in the silica.

The calcined silica was then slurried in hydrocarbon (isopentane) with silyl chromate—(Ph$_3$SiO)$_2$Cr$_2$O$_2$ (where Ph is phenyl)—at 45° C. for two hours in an amount that is sufficient to provide 0.25 weight % Cr (based on the weight of the silica). Diethylaluminum ethoxide (Et$_2$AlOEt) was then added at an Al/Cr mole ratio of 1.48/1) and the slurry was stirred for another 2.5 hours at 60° C. The hydrocarbon was then removed to provide a free flow powder having a light green color.

2. Gas Phase Polymerization of HDPE

A catalyst prepared in the manner described in Part 1 above was used in a gas phase polymerization reactor to prepare ethylene-hexene copolymers having comparatively high molecular weight (as indicated by the High Load Melt Index, or HLMI, value of the copolymers).

Characteristics of these HDPE copolymers are reported in Table 2.

Part B: Preparation HDPE Formulations with HYPERFORM® HPN20E (NA-1) and/or Zinc Oxide A co-rotating, intermeshing, self-wiping twin-screw extruder is used to compound all the HDPE compositions described in this patent application. Barefoot HDPE resins were also compounded using twin screw extruder to induce similar thermal history on barefoot HDPE resins as that of formulated HDPE compositions that nucleating agent HYPERFORM® HPN 20E NA-1 and/or Zinc Oxide. Desired amounts of nucleating agent NA-1 and/or Zinc Oxide of the described HDPE compositions were added through a side feeder so that the additives could be incorporated directly in the melt. Bare foot HDPE resins HDPE-2-A, HDPE-3-A and HDPE-1-A were also compounded using same run conditions described in Table 1 to induce similar thermal history as samples with nucleating agent NA-1 and/or Zinc Oxide.

TABLE 1

Run Conditions for Twin Screw Extruder are Listed Below:

| | |
|---|---|
| Feed Rate (kg/h) | 13.0 |
| Throughput (kg/h) | 13.0 |
| Pelletizer Speed (rpm) | 1000 |
| Extruder Speed (rpm) | 200 |
| Extruder Torque (%) | 80 |
| Melt Pressure (PSI) | 1560 |
| Melt Temperature (° C.) | 235 |
| Nitrogen Purge (L/min) | 65 |
| SME (kw/kg) | 0.265 |
| Pellet water temp (° C.) | 50 |
| Temperature Profile | |
| Zone 1 (° C.) | 45 |
| Zone 2 (° C.) | 185 |
| Zone 3 (° C.) | 225 |
| Zone 4 (° C.) | 210 |
| Zone 5 (° C.) | 200 |
| Zone 6 (° C.) | 200 |
| Zone 7 (° C.) | 190 |
| Zone 8 (° C.) | 190 |
| Zone 9 (° C.) | 220 |
| Zone 10 (° C.) (Die) | 230 |

Description of the Materials

HDPE: Each of the HDPE used in the inventive examples is a chromium catalyzed ethylene hexene copolymer produced using gas phase polymerization process with a high load melt index, as measured by ASTM 1238 at 190° C. using a 21.6 kg load of from 2 to 10 grams/10 minutes and a density of from 0.944 to 0.960 g/cc. Three different HDPE resins were used. They are identified as HDPE-1; HDPE-2 and HDPE-3. HLMI and density data for each are shown in Table 2.

Nucleating Agent: A product sold under the trademark HYPERFORM HPN20E NA-1 (sold by Milliken Chemicals); reported to be a mixture of calcium salt of hexahydrophthalic acid (CAS 491589-22-1) and zinc stearate in a 2/1 weight ratio. This nucleating agent is referred to in the examples as NA-1.

Zinc Oxide: ZnO was purchased from ZOCHEM Inc.
Test Methods and Calculations:
Density
Ethylene copolymer composition densities were determined using ASTM D792.
High Load Melt Index (HLMI)
High Load Melt Index ("HLMI") values were determined using ASTM D1238 at 190° C. using a 21.6 kg load.
Description of Experimental Results:
HDPE compositions with improved strain hardening can be produced by using a specific nucleating agent and zinc oxide.

Some of the important properties of exemplified compositions are given in Table 2. Elongational viscosity measurements were obtained by using Sentmanat Extension Rheometer (SER). This test is performed to measure the strain hardening behavior in several HDPE formulations considered here. Strain hardening phenomena occurs when the amorphous phase of the polymer is stretched to its maximum extension in tensile deformation. The increase in stress during strain hardening is attributed to the stress or strain induced molecular orientation and crystallization (Ward, I. M. *Mechanical Properties of Solid Polymers*; Wiley-Interscience: Toronto, 1971). The strain hardening index (SHI)

values of the resins with and without nucleating agents/additives are obtained using the following equation:

$$SHI = \frac{\eta_E^+}{3\eta_0} \quad (6)$$

where $\eta_E^+$ is elongational viscosity and $\eta_0$ is shear viscosity. The strain hardening index (SHI) values were calculated at a Hencky strain rate of 1 s$^{-1}$ and time of 1 s.

The SHI values of various HDPE compositions with or without nucleating agent NA-1™ NA-1 and/or Zinc Oxide are listed in Tables 3, 4, and 5. After much experimentation it was found that HDPE compositions produced by using a certain amounts of nucleating agent NA-1™ NA-1 and Zinc Oxide have synergistic improved SHI values as listed in Tables 3, 4 and 5 for the inventive compositions HDPE-2+500 ppm NA-1+500 ppm ZnO, HDPE-3+1000 ppm NA-1+300 ppm ZnO and HDPE-1+1000 ppm NA-1+300 ppm ZnO, respectively. The strain hardening behavior of the nucleated HDPE resins with Zinc oxide is considerably increased. This behavior is observed in different high load melt flow resins as described in Tables 3, 4, and 5, respectively. The elongational viscosity measurements were carried at different melt temperatures ranging from 140 to 200° C. for all the resins and different additive formulations described here. This range of melt temperatures was chosen to understand the resins' or molten parison's ability to withstand sagging (due to gravity) after extrusion (before molding and cooling processes).

Environmental stress cracking occurs by a brittle fracture mechanism and is attributed to disentanglement of inter-lamellar links. The majority of the inter-lamellar links reside at the lateral lamella surfaces and the probability to increase inter-lamellar links increases with lamella area (Cheng et al., *Tunnelling and Underground Space Technology* 26, 2011, 582-593). HDPE formulations (with NA-1 and ZnO) shown in the examples were found to have improved lamella area (i.e. lower average Pamela thickness) over barefoot HDPE and HDPE with NA-1 only formulations. The term "barefoot" means 'without NA-1 and/or ZnO additives' Higher lamella area (or lower lamella thickness) have been reported to increase the ESCR of polyethylene resins due to the enhanced phase interconnectivity. There is a clear increase in lamella area (and decrease in lamella thickness) observed for the inventive HDPE formulations of different high load melt flow indices as listed in Table 6. More importantly, there seems to be a synergetic effect on the lamella area/lamella thickness of the HDPE formulations when a combination of an organic nucleating agent/ZnO such as calcium salt of 1,2-Cyclohexanedicarboxylic acid with dispersing agent zinc stearate (NA-1) is used. This behavior is observed in all the three high melt flow resins shown in the examples (refer Table 6). The ratio of lamella area of HDPE formulation (with NA-1 and ZnO) to that of barefoot HDPE is at least 1.04, i.e., at least 4% increase in lamella area of HDPE formulation (with NA-1 and ZnO) in comparison with barefoot HDPE.

TABLE 2

Key Properties

| | \multicolumn{9}{c}{Grade} |
|---|---|---|---|---|---|---|---|---|---|
| | HDPE-2 | HDPE-2 | HDPE-2 | HDPE-3 | HDPE-3 | HDPE-3 | HDPE-1 | HDPE-1 | HDPE-1 |
| | \multicolumn{9}{c}{Sample #} |
| | 1 | 2 | 3 | 4 | 5 | 6 | 7 | 8 | 9 |
| HLMI (g/10 min) | 5 | 5 | 5 | 7.5 | 7.5 | 7.5 | 10 | 10 | 10 |
| Density (g/cc) | 0.955 | 0.955 | 0.955 | 0.954 | 0.954 | 0.954 | 0.952 | 0.952 | 0.952 |
| Nucleating Agent/ZnO/Additive (ppm) | NA-1 0 ZnO 0 | NA-1 500 ZnO 0 | NA-1 500 ZnO 500 | NA-1 0 ZnO 0 | NA-1 1000 ZnO 0 | NA-1 1000 ZnO 300 | NA-1 0 ZnO 0 | NA-1 1000 ZnO 0 | NA-1 1000 ZnO 300 |
| MP Peak (° C.)$^a$ | 132.9 | 133.5 | 133.2 | 131.8 | 132.1 | 131.9 | 130.6 | 131.1 | 131.2 |
| Heat of Fusion, ΔH (J/g)$^b$ | 212.2 | 211.9 | 209.7 | 218.3 | 220.3 | 218.1 | 215.3 | 214.8 | 216.6 |
| Crystallinity (%)$^c$ | 73.2 | 73.1 | 72.3 | 75.3 | 76.0 | 75.2 | 74.3 | 74.1 | 74.7 |
| Onset of Crystallization (° C.)$^d$ | 122.2 | 122.8 | 122.9 | 121.6 | 122.7 | 122.7 | 120.8 | 122.1 | 122.3 |
| Average Lamellar Thickness (nm) | 26.2 | 26.3 | 23.9 | 30.7 | 31.2 | 28.9 | 29.2 | 29.6 | 27.5 |
| Lamella Area (m$^2$/mol) | 1.02E+10 | 1.01E+10 | 1.11E+10 | 7.77E+09 | 7.63E+09 | 8.54E+09 | 7.27E+09 | 7.19E+09 | 7.75E+09 |
| Lamella Area ratio$^e$ | 1.00 | 0.99 | 1.09 | 1.00 | 0.98 | 1.10 | 1.00 | 0.99 | 1.07 |

$^a$Peak temperature of DSC endotherm from second heating cycle measured at a heating rate of 10° C./min.
$^b$Heat of fusion obtained from the area under DSC endotherm from second heating cycle measured at a heating rate of 10° C./min.
$^c$Heat of fusion divided by 290 J/g.
$^d$Onset of crystallization temperature is start-up temperatures of first DSC exotherm measured at a cooling rate of 10° C./min.
$^e$Ratio of lamella area of said ethylene copolymer formulation to that of the same ethylene copolymer, but containing neither said nucleating agent nor said zinc oxide.

TABLE 3

Strain Hardening Index Values Measured Using SER at a Hencky Strain Rate, $\dot{\varepsilon} = 1\ s^{-1}$ and Time $t = 1\ s$ of HDPE-2 with and without Nucleating Agents/ZnO/Additives

| Test Temperature (° C.) | HDPE-2 (Comparative 1) | HDPE-2 + 500 ppm NA-1 (Comparative 2) | HDPE-2 + 500 ppm NA-1 + 500 ppm ZnO (Inventive 1) |
|---|---|---|---|
| 140 | 1.11 | 1.12 | 1.18 |
| 150 | 1.11 | 1.13 | 1.16 |
| 160 | 1.11 | 1.12 | 1.16 |
| 180 | 1.10 | 1.12 | 1.15 |
| 200 | 1.10 | 1.11 | 1.13 |

TABLE 4

Strain Hardening Index Values Measured Using SER at a Hencky Strain Rate, $\dot{\varepsilon} = 1\ s^{-1}$ and Time $t = 1\ s$ of HDPE-3 with and without Nucleating Agents/ZnO/Additives

| Test Temperature (° C.) | HDPE-3 (Comparative 3) | HDPE-3 + 1000 ppm NA-1 (Comparative 4) | HDPE-3 + 1000 ppm NA-1 + 300 ppm ZnO (Inventive 2) |
|---|---|---|---|
| 140 | 1.01 | 1.05 | 1.10 |
| 150 | 1.02 | 1.03 | 1.07 |
| 160 | 1.02 | 1.03 | 1.06 |
| 180 | 1.01 | 1.02 | 1.05 |
| 200 | 1.01 | 1.02 | 1.04 |

TABLE 5

Strain Hardening Index Values Measured Using SER at a Hencky Strain Rate, $\dot{\varepsilon} = 1\ s^{-1}$ and time $t = 1\ s$ of HDPE-1 with and without Nucleating Agents/ZnO/Additives

| Test Temperature (° C.) | HDPE-1 (Comparative 5) | HDPE-1 + 1000 ppm NA-1 (Comparative 6) | HDPE-1 + 1000 ppm NA-1 + 300 ppm ZnO (Inventive 3) |
|---|---|---|---|
| 140 | 1.01 | 1.04 | 1.14 |
| 150 | 1.01 | 1.03 | 1.11 |
| 160 | 1.01 | 1.03 | 1.09 |
| 180 | 1.00 | 1.03 | 1.08 |
| 200 | 1.00 | 1.02 | 1.06 |

TABLE 6

Lamella Thickness and Lamella Area Values of Different HDPE Formulations/Compositions with and without Nucleating Agents/ZnO/Additives (a) HDPE-1 (b) HDPE-3 and (c) HDPE-2

| # | Resin/Composition | Avg. Lamella Thickness (nm) | Lamella Area ($m^2$/mol) |
|---|---|---|---|
| Comparative 1 | HDPE-2 | 26.2 | 1.02E+10 |
| Comparative 2 | HDPE-2 + 500 ppm NA-1 | 26.3 | 1.01E+10 |
| Inventive 1 | HDPE-2 + 500 ppm NA-1 + 500 ppm ZnO | 23.9 | 1.11E+10 |
| Comparative 3 | HDPE-3 | 30.7 | 7.77E+09 |
| Comparative 4 | HDPE-3 + 1000 ppm NA-1 | 31.2 | 7.63E+09 |
| Inventive 2 | HDPE-3 + 1000 ppm NA-1 + 300 ppm ZnO | 28.9 | 8.54E+09 |
| Comparative 5 | HDPE-1 | 29.2 | 7.27E+09 |
| Comparative 6 | HDPE-1 + 1000 ppm NA-1 | 29.6 | 7.19E+09 |
| Inventive 3 | HDPE-1 + 1000 ppm NA-1 + 300 ppm ZnO | 27.5 | 7.75E+09 |

The above non-limiting description illustrates novel HDPE compositions containing a combination of a selected nucleating agent and zinc oxide that are suitable for use in the manufacture of rigid molded articles or containers with improved strain hardening, elastic modulus and lamella area/thickness for the preparation of parts such as Drums, IBCs, and Blow molded fuel tanks.

The present polymer compositions have enhanced strain hardening behavior.

INDUSTRIAL APPLICABILITY

High density polyethylene compositions are provided which may employed in blow-molding processes to produce blow-molded articles such as, for example, drums, tanks, or containers.

The invention claimed is:

1. A blow molding composition comprising:
   A) a chromium catalyzed ethylene copolymer having:
      i) a high load melt index of 2 g/10 minutes to 10 g/10 minutes, as measured by ASTM 1238 at 190° C. using a 21.6 kg load; and
      ii) a density of from 0.944 to 0.955 g/cc;
   B) from 100 to 5000 ppm of a nucleating agent comprising a salt of hexahydrophthalic acid; and
   C) from 100 to 1000 ppm of zinc oxide.

2. The composition of claim 1, wherein said chromium catalyzed ethylene copolymer has a high load melt index of from 3 g/10 minutes to 6 g/10 minutes.

3. The composition of claim 1, wherein the salt of hexahydrophthalic acid is a calcium salt.

4. The composition of claim 1, wherein said chromium catalyzed ethylene copolymer is unimodal.

5. A blow molded article prepared from the composition of claim 1.

6. The blow molded article of claim 5, wherein said blow molded article is selected from the groups consisting of bottles, drums, intermediate bulk containers, and toys.

7. The blow molded article of claim 6, wherein said chromium catalyzed ethylene copolymer is unimodal.

8. The blow molded article of claim 5, wherein a ratio of a lamella area of the blow molded article including said chromium catalyzed ethylene copolymer to a lamella area of a barefoot blow molded article is greater than or equal to 1.04, wherein the barefoot blow molded article is prepared in the same manner as that of the blow molded article but without the nucleating agent or zinc oxide.

9. The blow molded article of claim 8, wherein said ratio is from 1.04 to 1.3.

10. A process of preparing a blow molded article, wherein said process comprises:
    I) preparing a parison from a blow molding composition comprising:
       A) a chromium catalyzed ethylene copolymer having
          i) a high load melt index of 2 g/10 minutes to 10 g/10 minutes, as measured by ASTM 1238 at 190° C. using a 21.6 kg load;
          ii) a density of from 0.944 to 0.955 g/cc;
       B) from 100 to 5000 ppm of nucleating agent; and
       C) from 100 to 1000 ppm of zinc oxide, and
    II) subjecting said parison to a blow molding process.

11. The process of claim 10, wherein said nucleating agent comprises a calcium salt of hexahydrophthalic acid.

12. The process of claim 10, wherein said chromium catalyzed ethylene copolymer is unimodal.

13. The process of claim 10, wherein said parison is heated to a temperature of from 180° C. to 300° C.

14. The process of claim 10, wherein said process produces a blow molded article selected from the group consisting of bottles, drums, intermediate bulk containers and toys.

15. A blow molding composition comprising:
- A) a chromium-catalyzed high density polyethylene that exhibits:
  - i) a high load melt index of 2 g/10 minutes to 10 g/10 minutes, as measured by ASTM 1238 at 190° C. using a 21.6 kg load; and
  - ii) a density of from 0.944 to 0.955 g/cc;
- B) from 100 to 5000 ppm of a salt of hexahydrophthalic acid; and
- C) from 100 to 1000 ppm of zinc oxide.

* * * * *